(12) United States Patent
Wang et al.

(10) Patent No.: US 8,718,273 B2
(45) Date of Patent: May 6, 2014

(54) APPARATUS FOR PROCESSING ECHO SIGNAL AND METHOD THEREOF

(75) Inventors: Chih-Chi Wang, Taichung County (TW); Rong-Jen Chang, Taipei County (TW); Ting-Fa Yu, Yunlin County (TW); Li-Wei Fang, Taichung County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1010 days.

(21) Appl. No.: 12/687,853

(22) Filed: Jan. 14, 2010

(65) Prior Publication Data

US 2010/0208882 A1 Aug. 19, 2010

(30) Foreign Application Priority Data

Feb. 18, 2009 (TW) .............................. 098105091 A

(51) Int. Cl.
*H04M 1/00* (2006.01)
*H04M 9/08* (2006.01)
*H04B 1/38* (2006.01)
*H04B 3/20* (2006.01)

(52) U.S. Cl.
USPC ....... 379/391; 379/406.01; 375/222; 370/286

(58) Field of Classification Search
USPC ...................................... 381/71.1–71.14, 318; 379/406.01–406.08
See application file for complete search history.

(56) References Cited

U.S. PATENT DOCUMENTS

| | | | | | |
|---|---|---|---|---|---|
| 5,323,459 | A | * | 6/1994 | Hirano | 379/391 |
| 5,796,819 | A | * | 8/1998 | Romesburg | 379/406.09 |
| 5,848,146 | A | * | 12/1998 | Slattery | 379/406.01 |
| 6,804,204 | B2 | * | 10/2004 | Lee et al. | 370/286 |
| 7,269,211 | B2 | * | 9/2007 | Lin et al. | 375/222 |
| 8,090,093 | B2 | * | 1/2012 | Aoyagi et al. | 379/406.01 |
| 2004/0252652 | A1 | | 12/2004 | Berestesky | |
| 2007/0133442 | A1 | | 6/2007 | Masuda | |
| 2007/0189547 | A1 | * | 8/2007 | Hsu et al. | 381/71.1 |
| 2010/0150367 | A1 | | 6/2010 | Mizuno | |

FOREIGN PATENT DOCUMENTS

CN 101292567 A 10/2008

* cited by examiner

*Primary Examiner* — Mohammad Islam
(74) *Attorney, Agent, or Firm* — McClure, Qualey & Rodack, LLP

(57) ABSTRACT

An echo signal processing apparatus is disclosed. The echo signal processing apparatus is utilized for generating a cancellation signal by using group phenomenon of a frequency response of an echo signal to remove the echo signal. The echo signal processing apparatus has lower cost and is able to remove the echo efficiently.

25 Claims, 4 Drawing Sheets

APPARATUS FOR PROCESSING ECHO SIGNAL AND METHOD THEREOF

BACKGROUND OF THE INVENTION

1. Field of the Invention

The present invention relates to a communication system, and more particularly, to a communication system having an echo cancellation apparatus.

2. Description of the Prior Art

In communication systems, part of a transmission signal transmitted by a transmitter will be coupled to a receiving signal received by a receiver, which is the so-called signal echo phenomenon. The signal echo phenomenon will affect the receiving performance of the receiver. In addition, the energy magnitude and shape of an echo signal depend on the transmission channel; that is, each transmission channel has a corresponding echo response. Generally speaking, the prior art design implements an echo canceller (EC) in the receiver. Ideally, the echo canceller will generate an echo cancellation signal, which is an inverse version of the echo signal and has a magnitude identical to that of the echo signal. Therefore, both signals will achieve echo cancellation, allowing the receiver to receive a cleaner receiving signal.

In general, the prior art design utilizes a digital filter to realize the echo canceller, where a digital filter with more taps can remove the echo signal more effectively. However, each tap includes a delay cell, a multiplier and an adder, wherein the multiplier requires a larger circuit area. In other words, the digital filter with more taps means a higher hardware cost. Therefore, how to design an echo canceller with lower hardware cost and/or remove the echo signal more effectively is an urgent issue for designers/manufacturers.

SUMMARY OF THE INVENTION

Therefore, one of the objectives of the present invention is to provide an echo processing apparatus for removing an echo signal, and a related method.

According to an embodiment of the present invention, an echo processing apparatus is disclosed. The echo processing apparatus is used for generating an echo cancellation signal to remove an echo signal, wherein the echo signal includes a first response and a second response. The echo processing apparatus includes: a first signal processing circuit, for generating a first echo cancellation signal substantially corresponding to the first response; a second signal processing circuit, for generating a second echo cancellation signal substantially corresponding to the second response, wherein the first response and the second response are at different times; and a summing circuit, for summing up the first echo cancellation signal and the second echo cancellation signal to generate the echo cancellation signal.

According to an embodiment of the present invention, a method for generating an echo cancellation signal is disclosed. The echo cancellation signal is used for cancelling an echo signal, which includes a first response and a second response. The method includes: generating a first echo cancellation signal substantially corresponding to the first response; generating a second echo cancellation signal substantially corresponding to the second response, wherein the first response and the second response are at different times; and summing up the first echo cancellation signal and the second echo cancellation signal to generate the echo cancellation signal.

As the present invention utilizes the group phenomenon of the impulse response of the echo signal to design the echo signal processing apparatus, the echo signal processing apparatus of the present invention therefore can use less taps to achieve the objective of removing the echo signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
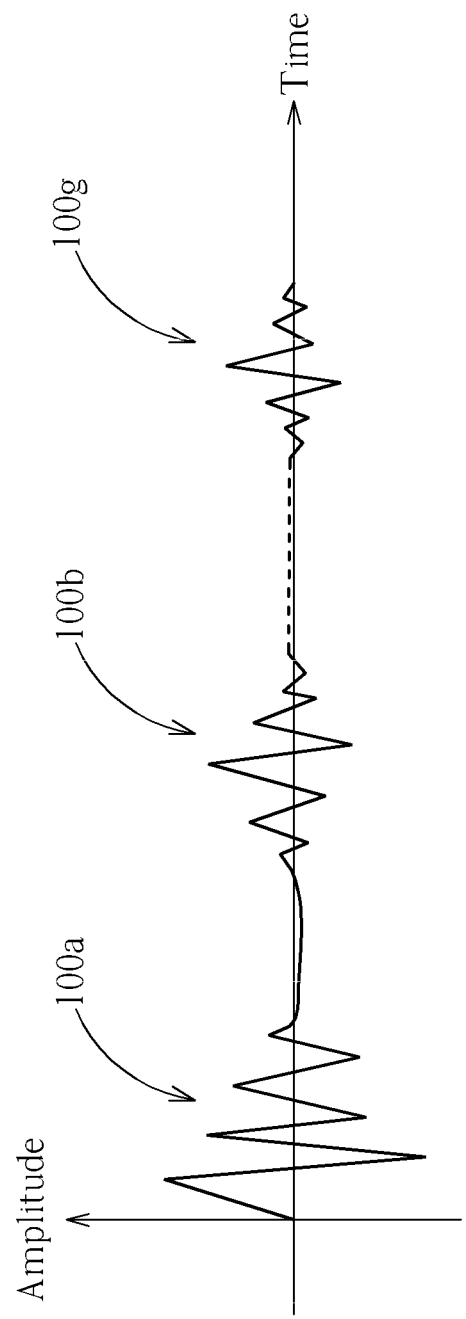
FIG. 1 is a diagram illustrating a frequency response of an echo signal.

The inventors of the present invention observe that the impulse response of the echo signal should have the characteristic shown in FIG. 1. If a prior art echo canceller is employed to remove such a long echo response shown in FIG. 1, a large number of taps is required. As shown in FIG. 1, the echo response will have group phenomenon, such as a plurality of responses 100a-100g included therein, where the responses (i.e. amplitude) between the groups are very small. Thus, the present invention purposely ignores the responses between groups. The group phenomenon of the echo response is mainly induced by the impedance mismatch. Taking a twist-pair for example, the impedance mismatch commonly occurs at the twist-pair sections (i.e., between the connections of the wires). However, the length and the number of the twist-pair sections are well-defined in the system, and the number and size of the groups can be controlled.

Figure 2:
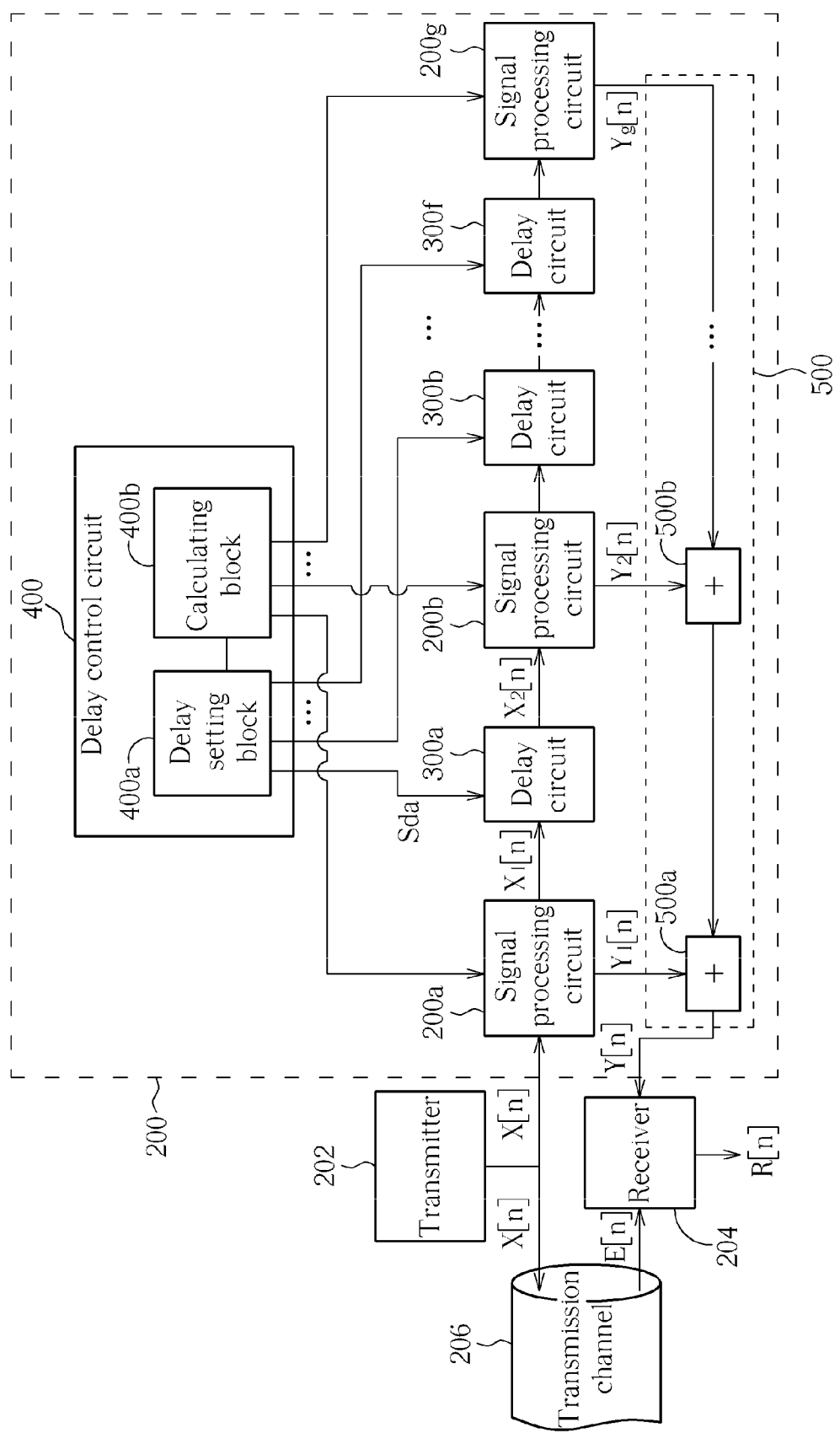
FIG. 2 is a diagram illustrating an echo cancellation circuit according to an embodiment of the present invention.

FIG. 2 is a diagram illustrating an echo cancellation circuit 200 according to an embodiment of the present invention. FIG. 2 further shows a transmitter 202, a receiver 204, and a transmission channel 206. The transmitter 202 transmits a transmission signal X[n] to the transmission channel 206. The echo signal will reflect to receiver 204 via the transmission channel 206. The echo cancellation circuit 200 generates an echo estimation signal Y[n] according to the transmission signal X[n]. The receiver 204 is used for receiving a received signal E[n] from the transmission channel 206 and the echo estimation signal Y[n] from the echo cancellation circuit 200 to generate a processed signal R[n]. The echo cancellation circuit 200 includes a plurality of signal processing circuits 200a-200g, a plurality of delay circuits 300a-300f, a delay control circuit 400 and a summing circuit 500. The signal processing circuit 200a is used for generating a first echo estimation signal $Y_1[n]$ according to the transmission signal X[n], and delaying the transmission signal X[n] to generate a first delay signal $X_1[n]$. The delay circuit 300a is used for delaying the first delay signal $X_1[n]$ by a specific delay time $T_1$ to generate a second delay signal $X_2[n]$. The signal processing circuit 200b is used for generating a second echo estimation signal $Y_2[n]$ according to the second delay signal $X_2[n]$. As other signals are processed according to the above-mentioned rules, the following signal processing circuits and the operations of the delay circuits are omitted here for brevity. The summing circuit 500 is coupled to the plurality of signal processing circuits 200a-200g, for generating the echo estimation signal Y[n] according to a plurality of echo estimation signals $Y_1[n]$-$Y_g[n]$. The summing circuit 500 is implemented using a plurality of adders. The delay control circuit 400 is used for controlling a plurality of specific delay times $T_1$-$T_f$ of a plurality of delay circuits 300a-300f, respectively.

The delay control circuit 400 includes a delay setting block 400a. The delay setting block 400a is used for controlling a plurality of delay circuits 300a-300f having a plurality of candidate delay times $Tx_1$-$Tx_f$, respectively. Then, the delay setting block 400a dynamically adjusts the candidate delay time of each delay circuit. The delay control circuit 400 further includes a calculating block 400b, coupled to a plurality of signal processing circuits 200a-200g which are employed for calculating a plurality of calculation results respectively corresponding to the candidate delay times $Tx_1$-$Tx_f$ according to parameter settings to which the signal processing circuits 200a-200g correspond when the delay circuits 300a-300f dynamically utilize the candidate delay times $Tx_1$-$Tx_f$, respectively. Finally, the delay setting block 400a further determines a plurality of specific delay times $T_1$-$T_f$ corresponding to the candidate delay times $Tx_1$-$Tx_f$ according to the calculation results.

Figure 3:
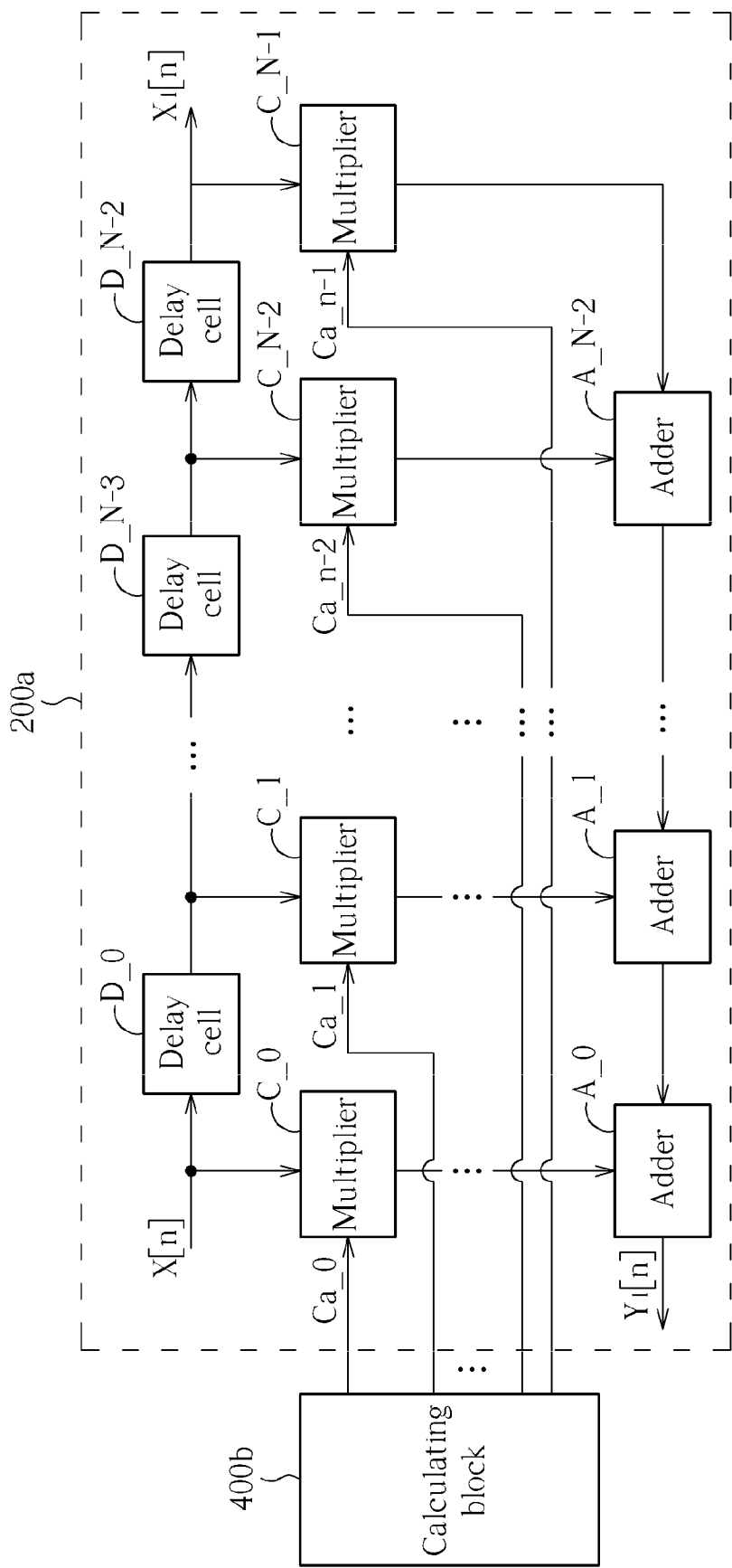
FIG. 3 is a diagram illustrating an embodiment of a signal processing circuit shown in FIG. 2 according to the present invention.

FIG. 3 is a diagram illustrating an embodiment of the signal processing circuit 200a shown in FIG. 2 according to the present invention. For brevity, the signal processing circuit is for illustrative purposes only, and the signal processing circuit 200a of this embodiment is implemented by a digital filter (e.g., a finite impulse response (FIR) filter), and operations of other signal processing circuits 200b-200g are similar to that of the signal processing circuit 200a. The signal processing circuit 200a includes a plurality of delay cells D_0-D_N−2, a plurality of multipliers C_0-C_N−1 and a plurality of adders A_0-A_N−2, wherein the value of N indicates the tap number of the digital filter. The calculating block 400b will set a plurality of parameters $C_{a,0}$-$C_{a,n-1}$, and provide them to a plurality of multipliers C_0-C_N−1, respectively.

According to an embodiment of the present invention, the signal processing circuits 200a-200g are used for processing a plurality of corresponding responses 100a-100g respectively (to generate a plurality of corresponding echo estimation signals $Y_1[n]$-$Y_g[n]$), as shown in FIG. 1 and FIG. 2. In other words, the echo estimation signals $Y_1[n]$-$Y_g[n]$ are used for removing the corresponding responses 100a-100g, respectively. To more precisely remove the responses 100a-100g from the signal, the specific delay times $T_1$-$T_f$ respectively corresponding to the delay circuits 300a-300f need to be calculated precisely.

First, the calculating block 400b performs a training mechanism on each of the signal processing circuits 200a-200g to calculate parameter(s) of each signal processing circuit. Taking the signal processing circuit 200a for example, the calculating block 400b will perform the training mechanism on the signal processing circuit 200a to determine the parameters $C_{a,0}$-$C_{a,n-1}$, and then the signal processing circuit 200a can utilize the parameters $C_{a,0}$-$C_{a,n-1}$ to generate the cancellation amount corresponding to the response 100a. By analogy, the parameters of each signal processing circuit can be determined when the delay circuits 300a-300f have candidate delay times $Tx_1$-$Tx_f$, respectively. Then, the delay setting block 400a dynamically adjusts the delay time of each delay circuit between the signal processing circuits 200a-200g, e.g. the delay setting block 400a dynamically adjusts the candidate delay time $Tx_1$ of the delay circuit 300a, for maximizing the total cancellation amount of the signal processing circuits 200a-200g. Finally, the calculating block 400b will find the maximum total cancellation amount of the signal processing circuits 200a-200g when the delay times of the delay circuits 300a-300f are specific delay times (i.e., $T_1$-$T_f$), respectively. Therefore, compared to the prior art echo canceller design, the echo cancellation circuit 200 of the present invention can implement fewer taps to achieve the same echo cancellation effect; or when the echo cancellation circuit 200 of the present invention has the same number of taps as the prior art echo canceller, the echo cancellation circuit 200 can remove a longer echo response.

In addition, how the delay setting block 400a adjusts the delay time of each delay circuit between the signal processing circuits 200a-200g is not limited in the present invention. The calculating block 400b will calculate the cancellation amount of each signal processing circuit that is applied to the echo signal E[n]block when the delay setting block 400a sets different delay times. Then, the calculating block 400b can calculate the total cancellation amount of the signal processing circuits 200a-200g that is applied to the echo signal E[n]. Therefore, the echo cancellation circuit 200 can remove the maximum portion of the echo signal E[n] when the delay times of the delay circuits 300a-300f are predetermined delay times $T_1$-$T_f$, respectively.

According to an embodiment, each time respectively setting delay times of the delay circuits 300a-300f, the calculating block 400b will sum up the absolute values of all parameters determined by the training mechanism, i.e., $$\sum_{k=0}^{M-1}\sum_{i=0}^{N-1}|C_{k,i}|.$$

According to another embodiment, the total cancellation amount of the signal processing circuits 200a-200g that is applied to the echo signal E[n] is determined by a calculation result, which is a sum of square values of all parameters of the signal processing circuits 200a-200g, i.e.

$$\sum_{k=0}^{M-1}\sum_{i=0}^{N-1}|C_{k,i}|^2,$$

where M is the number of the signal processing circuits 200a-200g, n is the number of taps of each signal processing circuit, k=0~M−1, i=0~N−1, and $C_{a,0}$ is the coefficient of the $k^{th}$ tap in the $i^{th}$ signal processing circuit. Therefore, the calculating block 400b can get a set of parameters corresponding to a maximum accumulation result via dynamically and iteratively adjusting the delay times of the delay circuits 300a-300f and performing the training mechanism on the signal processing circuits 200a-200g.

In addition, adjusting the delay times of the delay circuits 300a-300f can be accomplished by other means, such as utilizing the microprocessor, firmware, software, or a combination thereof.

Figure 4:
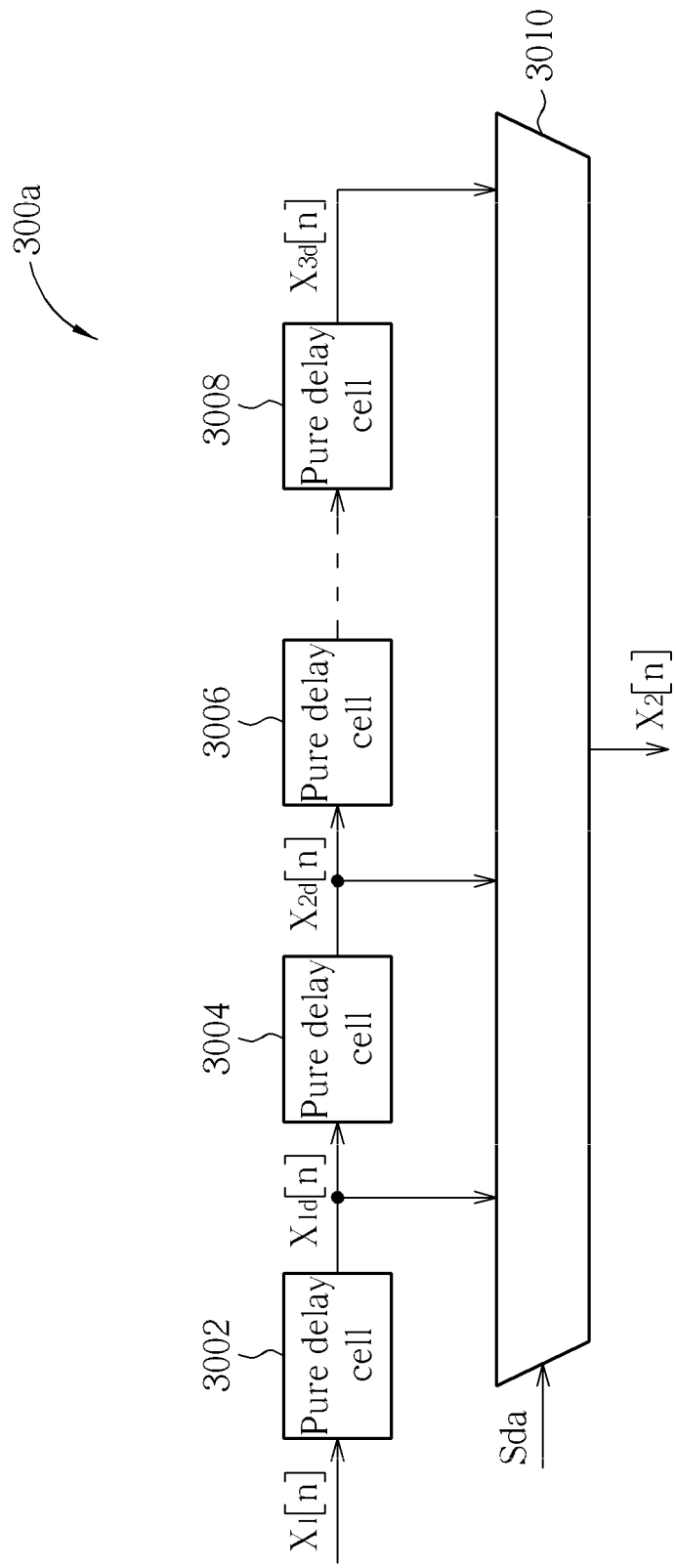
FIG. 4 is a diagram illustrating an embodiment of a delay circuit in the echo cancellation circuit shown in FIG. 2 according to the present invention.

FIG. 4 is a diagram illustrating an embodiment of a delay circuit of the echo cancellation circuit 200 shown in FIG. 2. The delay circuit 300a is illustrated for illustrative purposes. In this embodiment, the delay circuit is implemented by a pure delay line. After reading the description of the delay circuit 300a, the corresponding operations of the other delay circuits 300b-300f should be readily appreciated by those skilled in the art. The delay circuit 300a is implemented by a pure delay line (which comprises a plurality of cascaded pure delay cells 3002-3008) and a multiplexer 3010, wherein the delay setting block 400a generates a delay control signal Sda to the delay circuit 300a according to the specific delay time $T_1$. To put it simply, the specific delay time $T_1$ determines the delay control signal Sda to thereby select the required delay signal transmission $X_2[n]$ from the output signals $X_{1d}[n]$, $X_{2d}[n]$, $X_{3d}[n]$ of the delay cells.

Those skilled in the art will readily observe that numerous modifications and alterations of the device and method may be made while retaining the teachings of the invention.

What is claimed is:

1. An echo processing apparatus for generating an echo cancellation signal to remove an echo signal, the apparatus comprising:
   a first signal processing circuit, for generating a first echo cancellation signal substantially corresponding to a first echo response of the echo signal, the echo signal comprising a reflected portion of a transmitted signal;
   a second signal processing circuit, for generating a second echo cancellation signal substantially corresponding to a second echo response of the echo signal, wherein the first echo response and the second echo response are at different times; and
   a summing circuit, coupled to the first and the second signal processing circuits, for summing up the first echo cancellation signal and the second echo cancellation signal to generate the echo cancellation signal.

2. The apparatus of claim 1, further comprising:
   a delay circuit, coupled between the first and the second signal processing circuits, for adjusting a delay time of the delay circuit according to a control signal.

3. The apparatus of claim 2, further comprising:
   a delay control circuit, coupled to the delay circuit, for generating the control signal.

4. The apparatus of claim 3, wherein the delay control circuit comprises:
   a delay setting block, for controlling the delay circuit to utilize a plurality of candidate delay times; and
   a calculating block, coupled to the first and the second signal processing circuits, for calculating a plurality of calculation results respectively corresponding to the plurality of candidate delay times according to the plurality of candidate delay times;
   wherein the delay control circuit determines the control signal according to the plurality of calculation results.

5. The apparatus of claim 4, wherein the delay control circuit determines the control signal according to an extreme value of the plurality of calculation results.

6. The apparatus of claim 4, wherein the plurality of calculation results are sums of absolute values of parameters of the first and the second signal processing circuits, respectively, or sums of square values of parameters of the first and the second signal processing circuits, respectively.

7. The apparatus of claim 4, wherein the first and the second signal processing circuits calculate a parameter setting corresponding to each candidate delay time via a training mechanism.

8. The apparatus of claim 2, wherein the delay time corresponds to a time difference between the first echo response and the second echo response.

9. The apparatus of claim 2, wherein the first echo cancellation circuit substantially corresponds to the first echo response and the second echo cancellation substantially corresponds to the second echo response via adjusting the delay time of the delay circuit.

10. The apparatus of claim 1, wherein the first and the second signal processing circuits are digital filters.

11. The apparatus of claim 1, wherein the delay circuit comprises a plurality of cascaded delay cells and a multiplexer.

12. A method for generating an echo cancellation signal utilized for removing an echo signal, the method comprising:
   generating a first echo cancellation signal substantially corresponding to a first echo response of the echo signal, the echo signal comprising a reflected portion of a transmitted signal;
   generating a second echo cancellation signal substantially corresponding to a second response of the echo signal, wherein the first echo response and the second echo response are at different times; and
   summing up the first echo cancellation signal and the second echo cancellation signal to generate the echo cancellation signal.

13. The method of claim 12, further comprising:
   adjusting a delay time to make the first echo cancellation substantially correspond to the first echo response and the second echo cancellation substantially correspond to the second echo response.

14. The method of claim 13, wherein the step of adjusting the delay time comprises:
   calculating a plurality of calculation results corresponding to a plurality of candidate delay times, respectively; and
   determining the delay time according to the plurality of calculation results.

15. The method of claim 14, wherein the delay time is determined according to an extreme value of the plurality of calculation results.

16. The method of claim 12, wherein the delay time corresponds to a time difference between the first echo response and the second echo response.

17. The method of claim 12, wherein each of the first echo cancellation signal and the second echo cancellation signal is generated from performing a digital filtering operation.

18. An echo processing apparatus for generating an echo cancellation signal to remove an echo signal, the apparatus comprising:
   a first signal processing circuit, for generating a first echo cancellation signal;
   a second signal processing circuit, for generating a second echo cancellation signal;
   a delay circuit, coupled between the first and the second signal processing circuits, for adjusting a delay time of the delay circuit according to a control signal, thereby making the first echo cancellation substantially correspond to a first echo response and the second echo cancellation substantially correspond to a second echo response, wherein the first echo response and the second echo signal correspond to the echo signal, the echo signal comprising a reflected portion of a transmitted signal; and
   a summing circuit, coupled to the first and the second signal processing circuits, for summing up the first echo cancellation signal and the second echo cancellation signal to generate the echo cancellation signal.

19. The apparatus of claim 18, further comprising:
   a delay control circuit, coupled to the delay circuit, for generating the control signal.

20. The apparatus of claim 19, wherein the delay control circuit comprises:
   a delay setting block, for controlling the delay circuit to utilize a plurality of candidate delay times; and
   a calculating block, coupled to the first and the second signal processing circuits, for calculating a plurality of calculation results respectively corresponding to the plurality of candidate delay times according to the plurality of candidate delay times;

wherein the delay control circuit determines the control signal according to the plurality of calculation results.

21. The apparatus of claim 20, wherein the delay control circuit determines the control signal according to an extreme value of the plurality of calculation results.

22. The apparatus of claim 18, wherein the delay time corresponds to a time difference between the first echo response and the second echo response.

23. The apparatus of claim 18, wherein the first and the second signal processing circuits are digital filters.

24. The apparatus of claim 18, wherein the plurality of calculation results are sums of absolute values of parameters of the first and the second signal processing circuits, respectively, or sums of square values of parameters of the first and the second signal processing circuits, respectively.

25. The apparatus of claim 24, wherein the first and the second signal processing circuits calculate a parameter setting corresponding to each candidate delay time via a training mechanism.

* * * * *